United States Patent
Jin et al.

(10) Patent No.: US 9,230,192 B2
(45) Date of Patent: Jan. 5, 2016

(54) IMAGE CLASSIFICATION USING IMAGES WITH SEPARATE GRAYSCALE AND COLOR CHANNELS

(71) Applicant: Adobe Systems Incorporated, San Jose, CA (US)

(72) Inventors: Hailin Jin, San Jose, CA (US); Thomas Le Paine, Urbana (IL); Jianchao Yang, San Jose, CA (US); Zhe Lin, Fremont, CA (US); Jonathan W. Brandt, Santa Cruz, CA (US)

(73) Assignee: Adobe Systems Incorporated, San Jose, CA (US)

( * ) Notice: Subject to any disclaimer, the term of this patent is extended or adjusted under 35 U.S.C. 154(b) by 183 days.

(21) Appl. No.: 14/081,684

(22) Filed: Nov. 15, 2013

(65) Prior Publication Data
US 2015/0139536 A1    May 21, 2015

(51) Int. Cl.
G06K 9/52    (2006.01)
G06K 9/62    (2006.01)
G06K 9/46    (2006.01)

(52) U.S. Cl.
CPC ............ *G06K 9/6267* (2013.01); *G06K 9/4652* (2013.01)

(58) Field of Classification Search
CPC ............................ G06K 9/6267; G06K 9/4652
USPC ...................................... 382/156; 706/21, 31
See application file for complete search history.

(56) References Cited

U.S. PATENT DOCUMENTS

| | | | | |
|---|---|---|---|---|
| 6,587,592 | B2 * | 7/2003 | Georgiev et al. | 382/254 |
| 8,396,249 | B1 * | 3/2013 | Khosla et al. | 382/103 |
| 2003/0194124 | A1 * | 10/2003 | Suzuki et al. | 382/156 |
| 2008/0144932 | A1 * | 6/2008 | Chien et al. | 382/169 |
| 2010/0183217 | A1 * | 7/2010 | Seung et al. | 382/156 |

OTHER PUBLICATIONS

Krizhevsky et al.,"ImageNet Classification with Deep Convolutional Neural Networks", NIPS 2012, 2012, 9 pages.

\* cited by examiner

*Primary Examiner* — Samir Ahmed
(74) *Attorney, Agent, or Firm* — Wolfe-SBMC

(57) ABSTRACT

Image classification techniques using images with separate grayscale and color channels are described. In one or more implementations, an image classification network includes grayscale filters and color filters which are separate from the grayscale filters. The grayscale filters are configured to extract grayscale features from a grayscale channel of an image, and the color filters are configured to extract color features from a color channel of the image. The extracted grayscale features and color features are used to identify an object in the image, and the image is classified based on the identified object.

20 Claims, 5 Drawing Sheets

IMAGE CLASSIFICATION USING IMAGES WITH SEPARATE GRAYSCALE AND COLOR CHANNELS

BACKGROUND

Image classification is a fundamental problem in computer vision and machine learning. Image classification plays a key role in image understanding, and is a basis for object detection, image retrieval, and image tagging. Conventional image classification approaches, however, are often inefficient and inaccurate.

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

SUMMARY

Image classification techniques using images with separate grayscale and color channels are described. In one or more implementations, an image classification network includes grayscale filters and color filters which are separate from the grayscale filters. The grayscale filters are configured to extract grayscale features from a grayscale channel of an image, and the color filters are configured to extract color features from a color channel of the image. The extracted grayscale features and color features are used to identify an object in the image, and the image is classified based on the identified object.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

Overview

Figure 1:
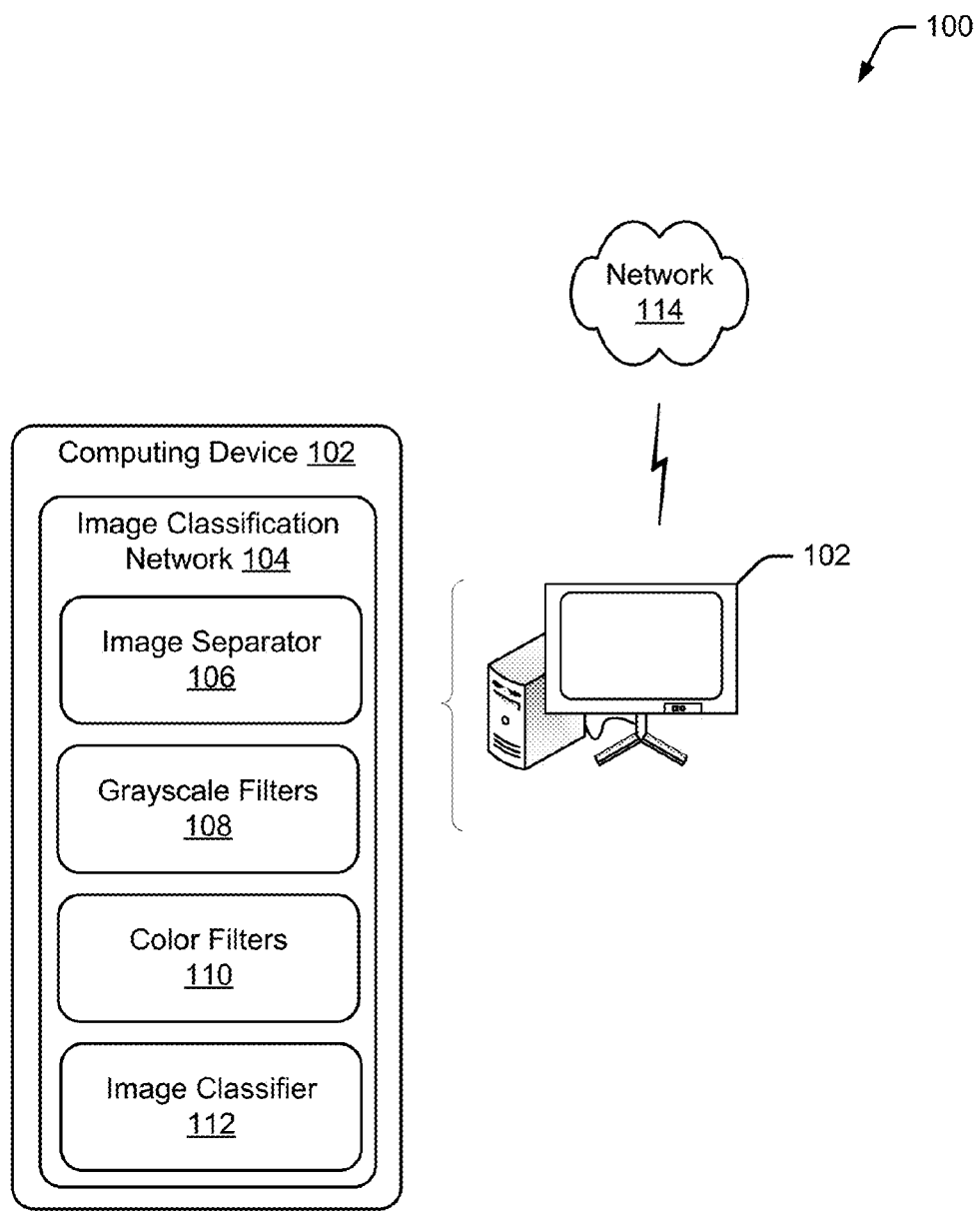
FIG. 1 illustrates an environment in an example implementation that is operable to employ techniques described herein.

Image classification techniques using images with separate grayscale and color channels are described. In one or more implementations, an image classification network is configured to use deep learning processes to recognize objects in images. The image classification network can be trained using training data that includes images which have been manually labeled to indicate objects in the images. For example, an image with an object of banana in the object can be manually labeled "banana". In some cases, the training data can be a database of images, such as ImageNet which includes thousands of images for each particular image. For example, ImageNet may include 1,000 classes or labels of images, such as banana, dog, and car. Each of these images may be labeled based on the object in the image. The image classification network can then be trained by receiving a manually labeled image, and attempting to classify the image based on objects in the image.

The image classification network uses an algorithm, such as stochastic gradient descent, to train a set of filters that collectively can be used to classify each image in the training data. The algorithm can be implemented using one or more filters in columns, or processing pipelines, of the image classification network. Each time an image is passed through the image classification network, the image classification computes an estimation of the classification or label of the image, and can also update weights for the filters.

In one or more implementations, the image classification network can be implemented as a neural network, such as a two-column convolutional neural network. Unlike conventional neural networks, however, the image classification network described herein is configured to receive two separate inputs instead of just one input. For example, an image can be separated into a grayscale channel of the image and a color channel of the image. The grayscale channel of the image corresponds to black and white differences of the image, and may be a grayscale copy of the original image. In contrast, the color channel of the image corresponds to color differences of an image.

The image classification network includes grayscale filters and color filters which are separate from the grayscale filters. The grayscale filters are configured to extract grayscale features from a grayscale channel of the image, and the color filters are configured to extract color features from a color channel of the image. The extracted grayscale features and color features are used to identify an object in the image, and the image is classified based on the identified object.

Feeding the grayscale and color channels of the image to separate filters increases the speed of the image classification network. Conventional image classifications networks perform 3D convolutions on input images because the images have three channels (e.g., RGB). Now, the grayscale filters can perform 2D convolutions on the single grayscale channel of the image. Performing 2D convolutions instead of 3D convolutions decreases the amount of computations by the grayscale filters and increases the speed of the image classification network.

Additionally, the image classification accuracy of the image classification network can be improved by using a greater number of grayscale filters than are used in either column of conventional networks. Note that the grayscale channel of an image is more important for image classification than the color channel because the grayscale channel of an image carries more information that can be used for image classification than the color channel of an image. In fact, the grayscale channel of an image contains almost as much information useable for object recognition as an original color version of the image.

Consider, for example, an image in the YCbCr color space which includes a Y channel which corresponds to the grayscale channel (also referred to as the luminance channel) of the image, and a CbCr channel which corresponds to the color channel of the image. In this case, the Y channel is essentially a grayscale (e.g., black and white) copy of the image. The CbCr channel includes a Cb component which corresponds to a blue-difference chrominance component of the image, and a Cr component which corresponds to a red-difference chrominance component of the image. Both the Cb and Cr channels include less information usable for object identification than either the original image or the grayscale channel of the image.

In addition, the grayscale channel of an image is more invariant to illumination changes than the color channel of an image. For example, colors can appear much differently in different lighting conditions, whereas the contrast between black and white is relatively consistent in widely varying lighting conditions.

Thus, as the grayscale channel is more important for image classification, by separating grayscale channels and color channels, the image classification network is able to include a greater number of grayscale filters than color filters. The number of grayscale filters is also greater than the number of filters in either column of conventional networks. Increasing the number of grayscale filters enables the image classification network to extract richer features with a higher dimension and more capacity from the grayscale channel of the image than the features extracted from either column of conventional networks. The richer features enables the image classification network to have a greater image classification accuracy than conventional networks. Further, because the grayscale filters perform 2D convolutions instead of 3D convolutions, the image classification network is still faster than conventional networks even with the increased number of grayscale filters.

Example Environment

FIG. 1 illustrates an environment 100 in an example implementation that is operable to employ techniques described herein. Environment 100 includes a computing device 102, which may be configured in a variety of different ways.

Computing device 102, for instance, may be configured as a desktop computer, a laptop computer, a mobile device (e.g., assuming a handheld configuration such as a tablet or mobile phone), and so forth. Thus, computing device 102 may range from full resource devices with substantial memory and processor resources (e.g., personal computers, game consoles) to a low-resource device with limited memory and/or processing resources (e.g., mobile devices). Additionally, although a single computing device 102 is shown, computing device 102 may be representative of a plurality of different devices, such as multiple servers utilized by a business to perform operations "over the cloud" as further described in relation to FIG. 5.

Computing device 102 is illustrated as including an image classification network 104. Image classification network 104 is representative of functionality to perform one or more techniques to classify images with separate grayscale and color channels. Image classification network 104 can be implemented as any type of machine learning image classification network, such as a neural network.

In one or more implementations, image classification network 104 is implemented as a two-column convolutional neural network. Unlike conventional neural networks, however, image classification network 104 is configured to receive two separate inputs instead of just one input. For example, as described in more detail below, image classification network 104 is configured to receive a grayscale channel of an image and a color channel of the image.

Image classification network 104 includes an image separator 106, grayscale filters 108, color filters 110, and an image classifier 112. Further discussion of image classification network 104 can be found in FIG. 2.

Figure 5:
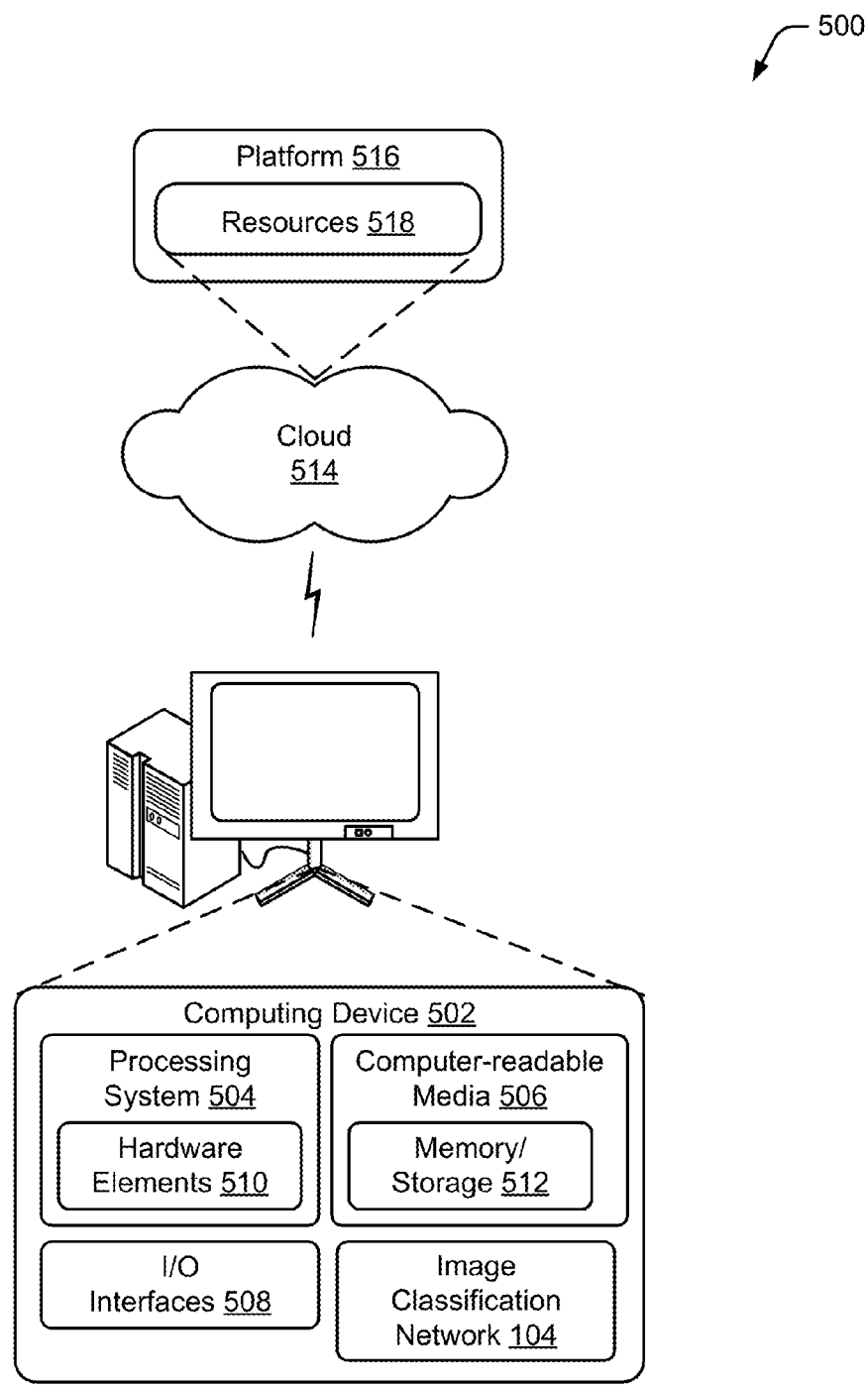
FIG. 5 illustrates an example system including various components of an example device that can be implemented as any type of computing device as described and/or utilized with reference to FIGS. 1-4 to implement embodiments of the techniques described herein.

Although illustrated as part of computing device 102, functionality of image classification network 104 may also be implemented in a distributed environment, remotely via a network 114 (e.g., "over the cloud") as further described in relation to FIG. 5, and so on. Although network 114 is illustrated as the Internet, the network may assume a wide variety of configurations. For example, network 114 may include a wide area network (WAN), a local area network (LAN), a wireless network, a public telephone network, an intranet, and so on. Further, although a single network 114 is shown, network 114 may also be configured to include multiple networks.

Figure 2:
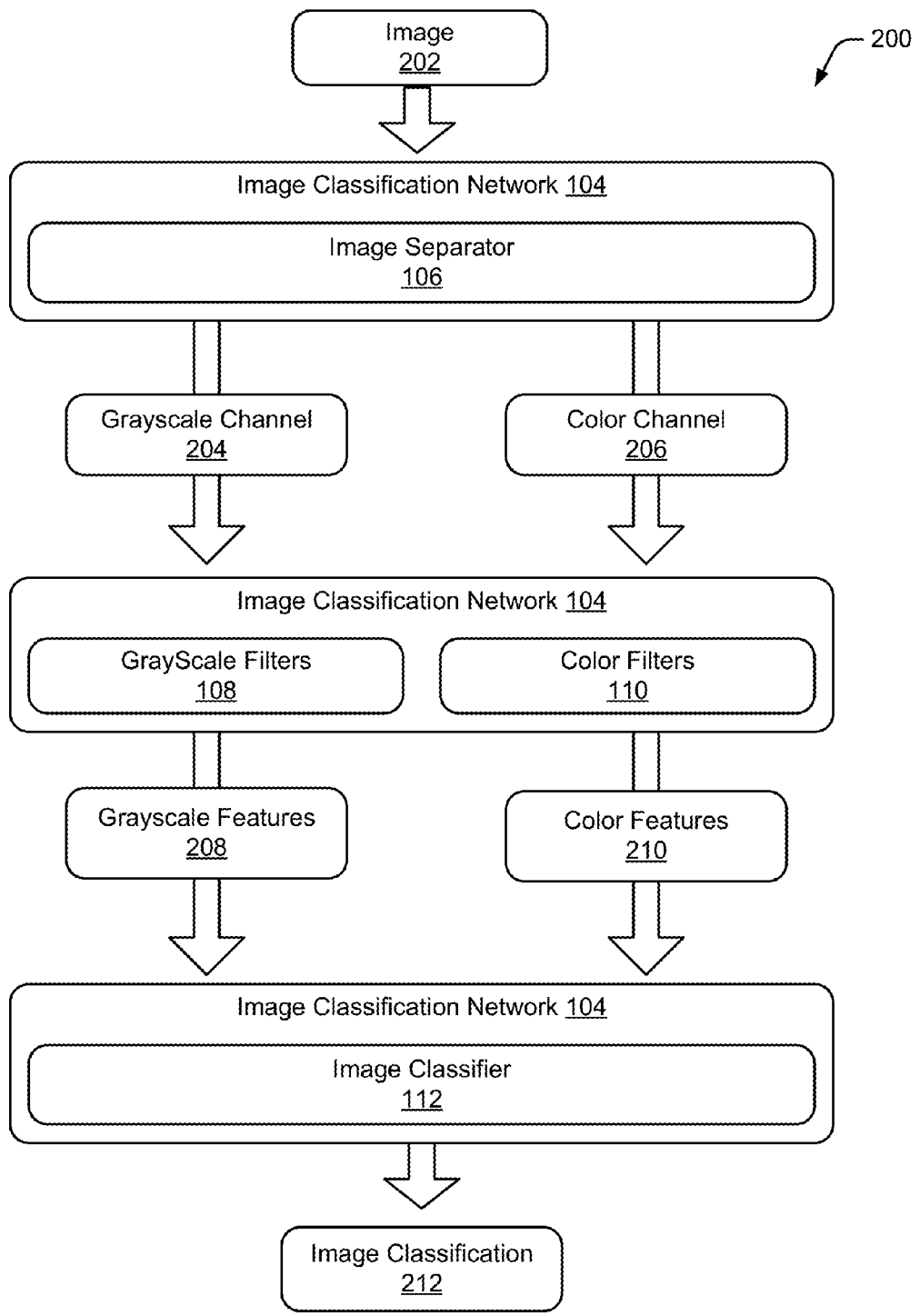
FIG. 2 illustrates a system in an example implementation in which an image classification network is used to classify images with separate grayscale and color channels.

FIG. 2 illustrates a system 200 in an example implementation in which image classification network 104 is used to classify images with separate grayscale and color channels.

In this example, an image 202 is received by image separator 106 of image classification network 104. In a training phase, image 202 is an annotated training image, such as an annotated RGB image, selected from a training data set, such as ImageNet. The training phase is used to train filters using an algorithm such as stochastic gradient descent. After the training phase, however, the filters are fixed and image 202 can be an un-annotated image.

Image separator 106 separates image 202 into a first version and a second version of the image. In one or more implementations, image separator 106 separates image 202 into a grayscale channel 204 of image 202 and a color channel 206 of image 202. Color digital images are made of pixels, and pixels are made of combinations of primary colors. Thus, a channel in this context is the grayscale image of the same size as a color image, made of just one of these primary colors. For instance, a standard digital image will have a red, green and blue channel, whereas a grayscale image has just one channel.

In one or more implementations, image separator 106 receives an RGB image, and converts the RGB image into a YCbCr image. The YCbCr color space includes a Y channel which corresponds to the luminance or grayscale channel and a CbCr channel which corresponds to the color channel. In this instance, the Y channel is a grayscale copy of the original RGB image. Thus, to separate the grayscale channel and the color channel of the YCbCr image, image separator 106 can separate the Y channel of the YCbCr image from the CbCr channel of the YCbCr image.

In one or more implementations, the grayscale channel 204 of image 202 corresponds to a grayscale version of image 202, and the color channel 206 of image 202 corresponds to the original image (e.g., the original RGB image).

It is to be appreciated that image separator 106 can be implemented to convert image 202 into any other type of color space, such as the YCC color space or the LAB color space, to name just a few. For each of these color spaces, image separator 106 can separate the grayscale or luminance channel from the color channel(s). For example, for the YCC color space, the Y luminance channel can be separated from the CC color channel.

Unlike conventional image classification networks, image classification network 104 is configured with separate grayscale filters 108 and color filters 110. For example, grayscale filters 108 may be aligned in a first column (e.g., processing pipeline) of image classification network 104, and color filters 110 may be aligned in a second column of image classification network 104. Image classification network 104 passes grayscale channel 204 of image 202 to grayscale filters 108 and passes color channel 206 of image 202 to color channel 110. For example, the Y channel of a YCbCr image 202 can be passed to grayscale filters 108, and the CbCr channel of image 202 can be passed to color filters 110.

Grayscale filters 108 and color filters 110 are configured to extract features from image 202. For example, grayscale filters 108 extract grayscale features 208 from the grayscale channel 204 of image 202, whereas color filters 110 extract color features 210 from the color channel 206 of image 202. The extracted features may include local features.

By passing different channels of image 202 to different sets of filters, the training speed of the image classification is increased. For example, in a first layer of conventional image classification networks, the training performs 3D convolutions on an input image because the input image has 3 channels (e.g., an RGB image). In the first layer of image classification network 104, however, 2D convolutions are performed on the grayscale channel. Performing 2D convolutions on the grayscale channel of the image, instead of 3D convolutions, increases the speed and efficiency of image classification network 104. Image classification network 104 may still perform 3D convolutions on the color channel of the image, but the amount of computations is still much less compared to conventional image classification networks.

In one or more implementations, the number of grayscale filters 108 is greater than the number of color filters 110 because the grayscale features 208 are more important for image classification. As noted above, the grayscale channel 204 of image 202 carries more information that can be used for image classification than the color channel 206 of image 202. Consider, for example, an image of a yellow banana. In this example, a grayscale copy of a yellow banana can still be determined to be a banana based on the shape of the banana.

The greater number of filters enables grayscale filters 108 to extract richer features with a higher dimension and more capacity from the grayscale channel 204 than the features extracted by color filters 110. The number of grayscale filters is also greater than the number of filters in either column of conventional networks. Increasing the number of grayscale filters 108 enables image classification network 104 to extract richer features with a higher dimension and more capacity from the grayscale channel 204 of image 202 than the features extracted from either column of conventional networks. The richer features enable image classification network 104 to have a greater image classification accuracy than conventional networks. Further, because grayscale filters 108 perform 2D convolutions instead of 3D convolutions, image classification network 104 is still faster than conventional networks even with the increased number of grayscale filters.

Image classifier 112 then identifies an object in image 202 based on the grayscale features 208 extracted by grayscale filters 108 and the color features 210 extracted by color filters 110, and generates an image classification 212 (e.g., label) for image 202 based on the identified object in the image. For example, if image classifier 112 identifies a banana in image 202, the image can be classified as "banana". Image classification 212 may be generated based on a probability distribution over a predetermined set of labels.

Implementation Example

Figure 3:
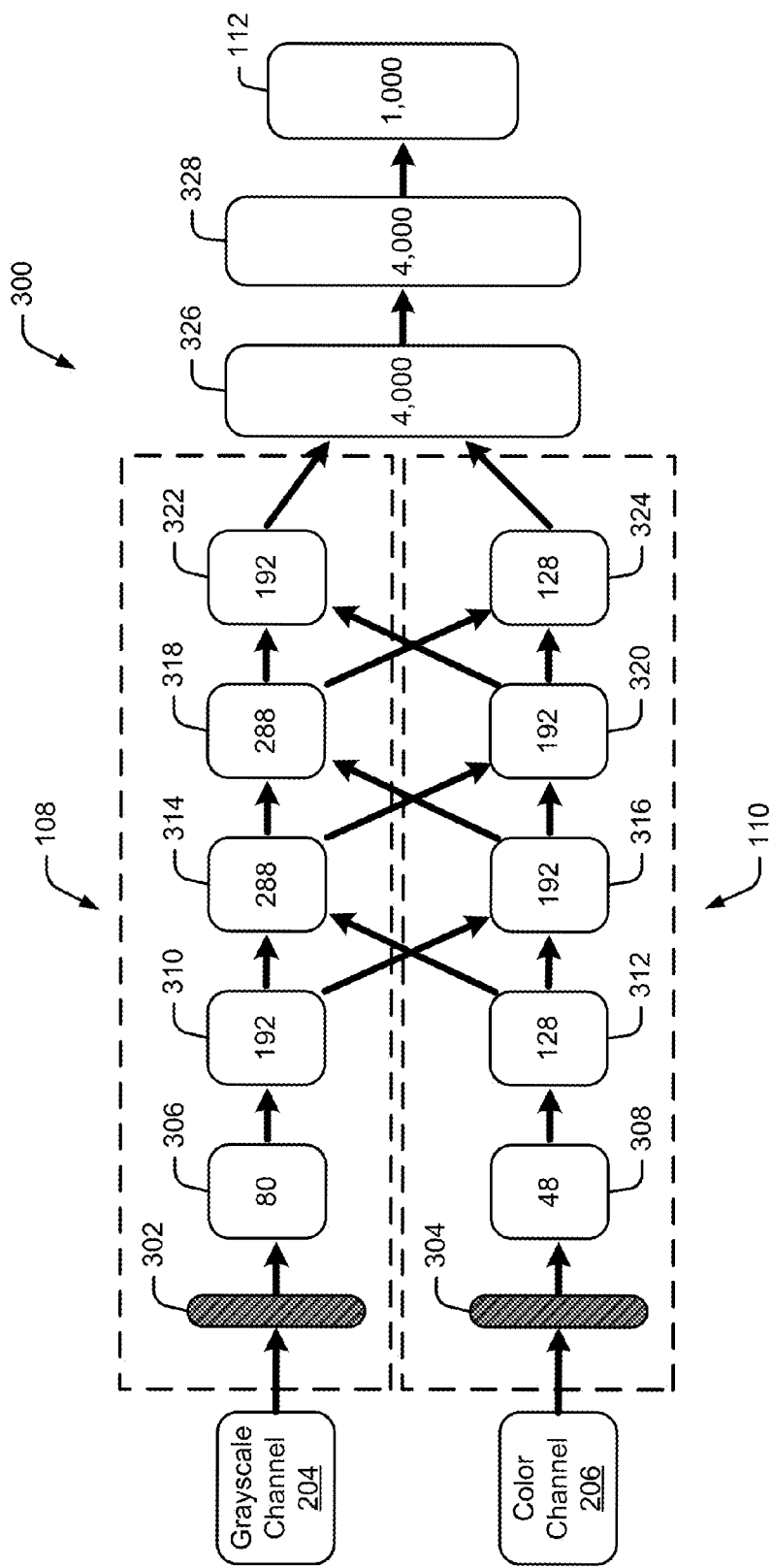
FIG. 3 illustrates an example of an image classification network in accordance with one or more embodiments.

FIG. 3 illustrates an example 300 of image classification network 104 in accordance with one or more embodiments. In this example, image classification network 104 is a two-column neural network. Unlike conventional two-column neural networks which input the same image into both the top column and the bottom column, image classification network 104 includes a first column of grayscale filters 108 which is separate from a second column of color filters 110. As discussed above, grayscale filters 108 are configured to receive grayscale channel 204 of image 202, and color filters 110 are configured to receive color channel 206 of image 202.

In this particular example, image classification network 104 contains eight layers of filters with weights. A first layer includes grayscale filters 302 and color filters 304, a second layer includes grayscale filters 306 and color filters 308, a third layer includes grayscale filters 310 and color filters 312, a fourth layer includes grayscale filters 314 and color filters 316, a fifth layer includes grayscale filters 318 and color filters 320, a sixth layer includes grayscale filters 322 and color filters 324, a seventh layer includes filters 326, and an eighth layer includes filters 328.

In this example, second, third, fourth, fifth, and sixth layers include convolutional filters. As discussed above, unlike conventional neural networks, the convolutional grayscale filters 306, 310, 314, 318, and 322 are 2D convolutional filters. However, the convolutional color filters 308, 312, 316, 320, and 324 may be 3D convolutional filters.

In this example, the sixth and seventh layers, corresponding to filters 326 and 328, are fully-connected layers. The output of the last fully-connected layer of filter 328 is fed to image classifier 112 to classify the image. In this example, image classifier 112 is a 1,000-way softmax which produces a distribution over 1,000 class labels.

The number associated with each set of filters corresponds to the number of filters. As illustrated in FIG. 3, the second layer includes 80 grayscale filters 306 and 48 color filters 308. The third layer receives the response-normalized and pooled output of the second layer and filters it with 192 grayscale filters 310, and 128 color filters 312. The fourth layer includes 288 grayscale filters 314, and 192 color filters 316. The fifth layer also includes 288 grayscale filters 318, and 192 color filters 320. The sixth layer includes 192 grayscale filters 322, and 128 color filters 324. Filters 326 and 328 of the fully connected layers may include approximately 4,000 filters.

It should be noted, therefore, that for each layer, the number of grayscale filters is greater than the number of color filters enabling the grayscale filters 108 to extract richer features with a higher dimension and more capacity from the grayscale channel 204 of the image than the features extracted by color filters 110. Further, the number of grayscale filters for each layer is greater than the number of filters in a corresponding layer of a top column of conventional networks. For example, conventional image processing networks may include 48, 128, 192, 192, and 128 filters for both the top and bottom columns of the second, third, fourth, fifth, and sixth layers, respectively.

As illustrated in FIG. 3, grayscale filters 108 are positioned in a separate column, or processing pipeline, than color filters 110. However, there are some connections between the grayscale filters and the color filters in the separate columns. For instance, layers three and four are connected. More particularly, grayscale filters 310 and color filters 312 in the third layer are connected to color filters 316 and grayscale filters 314, respectively, in the fourth layer.

Unlike conventional neural networks, layers four and five and layers five and six are also connected between columns. More particularly, grayscale filters 314 and color filters 316 in the fourth layer are connected to color filters 320 and grayscale filters 318, respectively, in the fifth layer. Similarly, grayscale filters 318 and color filters 320 in the fifth layer are connected to color filters 324 and grayscale filters 322, respectively, in the sixth layer.

Example Procedure

The following discussion describes object detection techniques that may be implemented utilizing the previously described systems and devices. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 4:
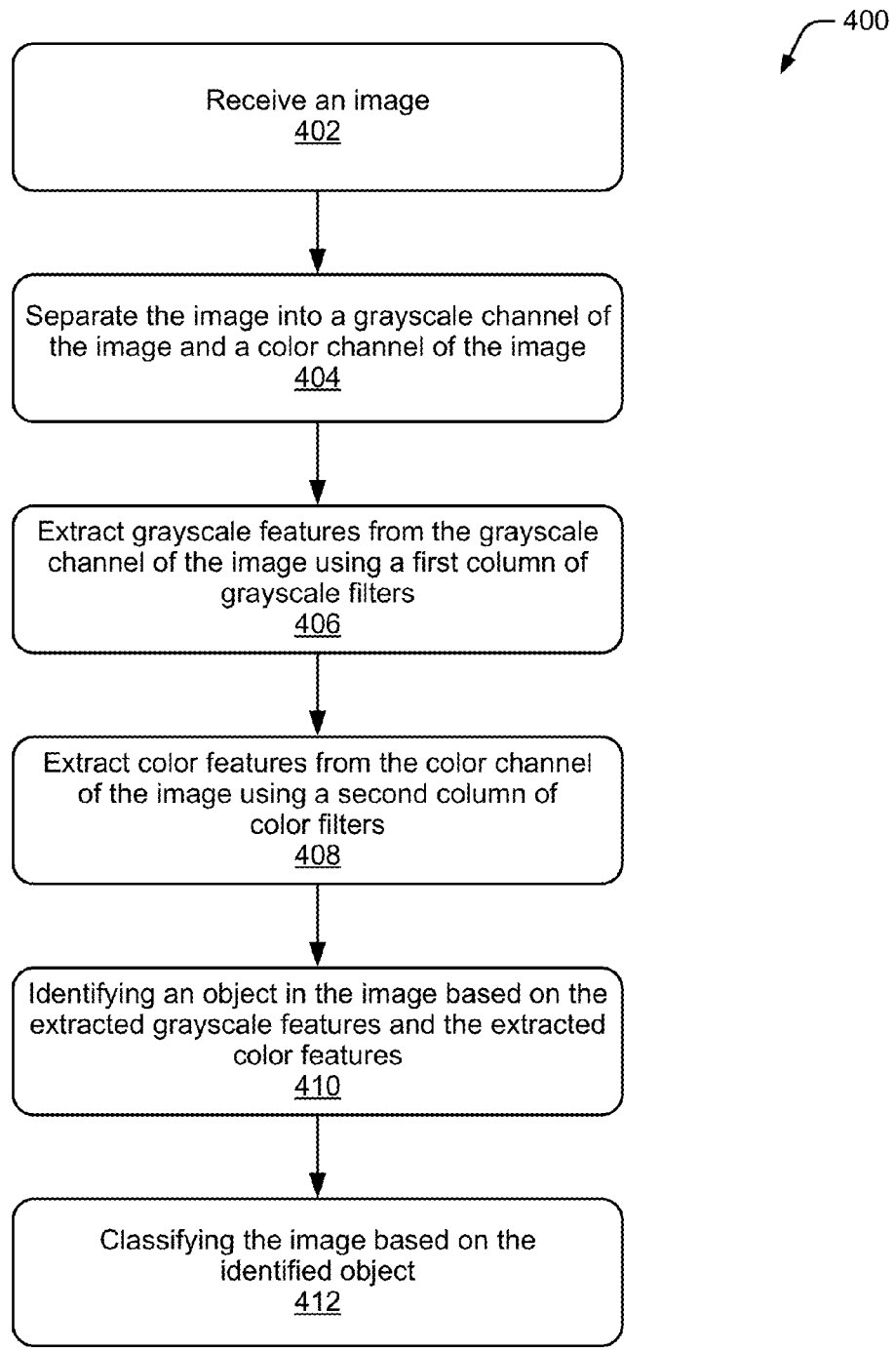
FIG. 4 illustrates a procedure in an example implementation in which an image classification network is used to classify images with separate grayscale and color channels.

FIG. 4 illustrates a procedure 400 in an example implementation in which an image classification network is used to classify images with separate grayscale and color channels.

At 402, an image is received. For example, image separator 106 (FIG. 1) receives an image 202 (FIG. 2).

At 404, the image is separated into a grayscale channel of the image and a color channel of the image. For example, image separator 106 separates image 202 into a grayscale channel 204 of the image and a color channel 206 of the image.

At 406, grayscale features are extracted from the grayscale channel of the image using a first column of grayscale filters. For example, grayscale filters 108 of image classification network 104 extracts grayscale features 208 from grayscale channel 204 of image 202.

At 408, color features are extracted from the color channel of the image using a second column of color filters. For example, color filters 110 of image classification network 104 extracts color features 210 from color channel 206 of image 202.

At 410, an object is identified in the image based on the extracted grayscale features and the extracted color features, and at 412 the image is classified based on the identified object. For example, image classifier 112 identifies an object in image 202 based on the extracted grayscale features 208 and the extracted color features 210, and classifies the object based on the identified object.

Having described example procedures in accordance with one or more implementations, consider now an example system and device that can be utilized to implement the various techniques described herein.

Example System and Device

FIG. 5 illustrates an example system generally at 500 that includes an example computing device 502 that is representative of one or more computing systems and/or devices that may implement the various techniques described herein. This is illustrated through inclusion of image classification network 104, which operates as described above. The computing device 502 may be, for example, a server of a service provider, a device associated with a client (e.g., a client device), an on-chip system, and/or any other suitable computing device or computing system.

The example computing device 502 is illustrated includes a processing system 504, one or more computer-readable media 506, and one or more I/O interface 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 506 is illustrated as including memory/storage 512. The memory/storage 512 represents memory/storage capacity associated with one or more computer-readable media. The memory/storage component 512 may include volatile media (such as random access memory (RAM)) and/or nonvolatile media (such as read only memory (ROM), Flash memory, optical disks, magnetic disks, and so forth). The memory/storage component 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of a module that is executable by the computing device 502 as software may be achieved at least partially in hardware, e.g., through use of computer-readable storage media and/or hardware elements 510 of the processing system 504. The instructions and/or functions may be executable/operable by one or more articles of manufacture (for example, one or more computing devices 502 and/or processing systems 504) to implement techniques, modules, and examples described herein.

The techniques described herein may be supported by various configurations of the computing device 502 and are not limited to the specific examples of the techniques described herein. This functionality may also be implemented all or in part through use of a distributed system, such as over a "cloud" 514 via a platform 516 as described below.

The cloud 514 includes and/or is representative of a platform 516 for resources 518. The platform 516 abstracts underlying functionality of hardware (e.g., servers) and software resources of the cloud 514. The resources 518 may include applications and/or data that can be utilized while computer processing is executed on servers that are remote from the computing device 502. Resources 518 can also include services provided over the Internet and/or through a subscriber network, such as a cellular or Wi-Fi network.

The platform 516 may abstract resources and functions to connect the computing device 502 with other computing devices. The platform 516 may also serve to abstract scaling of resources to provide a corresponding level of scale to encountered demand for the resources 518 that are implemented via the platform 516. Accordingly, in an interconnected device implementation, implementation of functionality described herein may be distributed throughout the system 500. For example, the functionality may be implemented in part on the computing device 502 as well as via the platform 516 that abstracts the functionality of the cloud 514.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A system comprising:
   one or more processors; and
   a memory comprising instructions stored thereon that, responsive to execution by the one or more processors implement an image classification network, the image classification network comprising:
      an image separator configured to separate an image into a grayscale channel of the image and a color channel of the image, the image comprising a color image;
      a first column of grayscale filters configured to receive the grayscale channel of the image and extract grayscale features from the grayscale channel of the image;
      a second column of color filters configured to receive the color channel of the image and extract color features from the color channel of the image, wherein the image classification network has a greater number of grayscale filters than color filters;
      an image classifier configured to identify an object in the image based on the extracted grayscale features and the extracted color features, and classify the image based on the identified object.

2. The system of claim 1, wherein the image comprises an RGB image.

3. The system of claim 1, wherein the image classification network comprises a two-column neural network.

4. The system of claim 1, wherein the image classification network further comprises an image separator configured to receive the image and separate the image into the grayscale channel of the image and the color channel of the image.

5. The system of claim 4, wherein the image comprises an RGB image, and wherein the image separator is configured to separate the image by:
   converting the RGB image into a YCbCr image; and separating the Y channel of the YCbCr image from the CbCr channel of the YCbCr image, the Y channel comprising the grayscale channel of the image and the CbCr channel comprising the color channel of the image.

6. The system of claim 1, wherein the grayscale channel of the image comprises a grayscale version of the image, and wherein the color channel of the image comprises the image.

7. The system of claim 1, wherein the grayscale filters include one or more 2D convolutional filters.

8. The system of claim 1, wherein the color filters include one or more 3D convolutional filters.

9. The system of claim 1, wherein the image comprises an annotated training image selected from a training data set of images.

10. A computer-implemented method comprising:
receiving an image, the image comprising a color image;
separating the image into a grayscale channel of the image and a color channel of the image;
extracting grayscale features from the grayscale channel of the image using a first column of grayscale filters;
extracting color features from the color channel of the image using a second column of color filters, wherein the first column of grayscale filters has a greater number of filters than the second column of color filters;
identifying an object in the image based on the extracted grayscale features and the extracted color features; and
classifying the image based on the identified object.

11. One or more computer-readable storage media comprising instructions stored thereon that, responsive to execution by one or more processors, perform operations comprising:
receiving an RGB image;
converting the RGB image into a YCbCr image;
separating the Y channel of the YCbCr image from the CbCr channel of the YCbCr image, the Y channel comprising the grayscale channel of the image and the CbCr channel comprising the color channel of the image;
extracting features from the Y channel of the image using 2D convolutional filters;
extracting additional features from the CbCr channel of the image using 3D convolutional filters, wherein the number of 2D convolutional filters is greater than the number of 3D convolutional filters; and
classifying the image based on the extracted features and the extracted additional features.

12. The computer-implemented method of claim 10, wherein the image comprises an RGB image.

13. The computer-implemented method of claim 12, wherein the separating further comprises:
converting the RGB image into a YCbCr image; and
separating the Y channel of the YCbCr image from the CbCr channel of the YCbCr image, the Y channel comprising the grayscale channel of the image and the CbCr channel comprising the color channel of the image.

14. The computer-implemented method of claim 10, wherein the grayscale channel of the image comprises a grayscale version of the image, and wherein the color channel of the image comprises the image.

15. The computer-implemented method of claim 10, wherein the grayscale filters comprise 2D convolutional filters.

16. The computer-implemented method of claim 10, wherein the image comprises an annotated training image selected from a training data set of images.

17. The one or more computer-readable storage media of claim 11, wherein the classifying further comprises:
identifying an object in the image based on the extracted features from the Y channel of the image and the additional extracted features from the CbCr channel of the image; and
classifying the image based on the identified object.

18. The one or more computer-readable storage media of claim 11, wherein the 2D convolutional filters and the 3D convolutional filters comprise a two-column neural network.

19. The one or more computer-readable storage media of claim 11, wherein the grayscale channel of the image comprises a grayscale version of the image, and wherein the color channel of the image comprises the image.

20. The one or more computer-readable storage media of claim 11, wherein the image comprises an annotated training image selected from a training data set of images.

* * * * *